INVENTOR
FLEMING D. LONG

BY Wright and Wright

ATTORNEYS

Feb. 13, 1962 F. D. LONG 3,020,744
FRICTION TESTER
Filed March 17, 1960 3 Sheets-Sheet 2
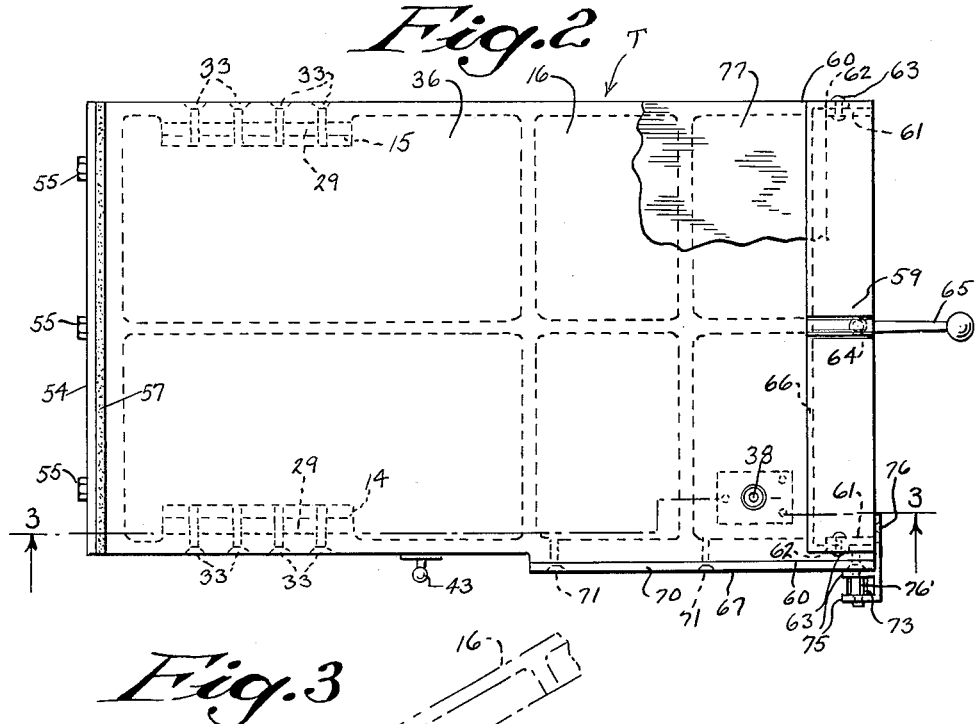
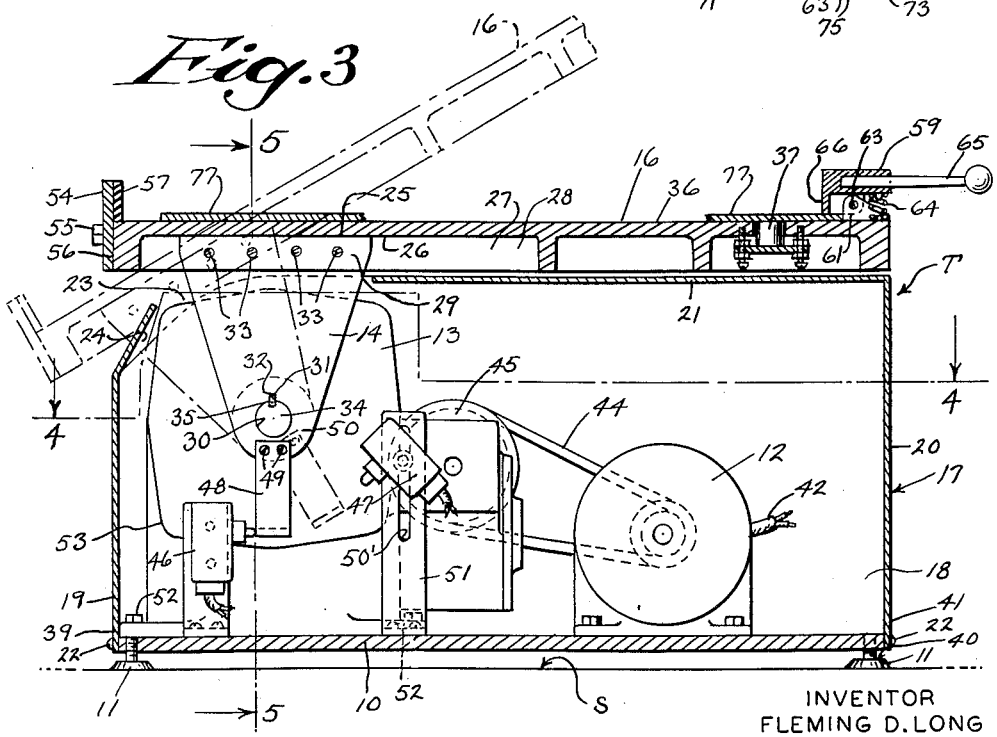
INVENTOR
FLEMING D. LONG
BY Wright and Wright
ATTORNEYS Feb. 13, 1962  F. D. LONG  3,020,744
FRICTION TESTER
Filed March 17, 1960  3 Sheets-Sheet 3
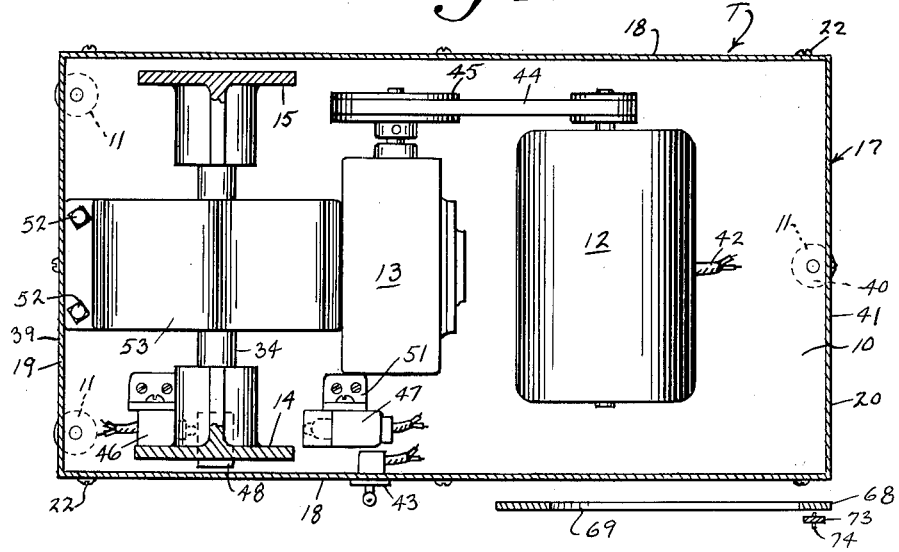
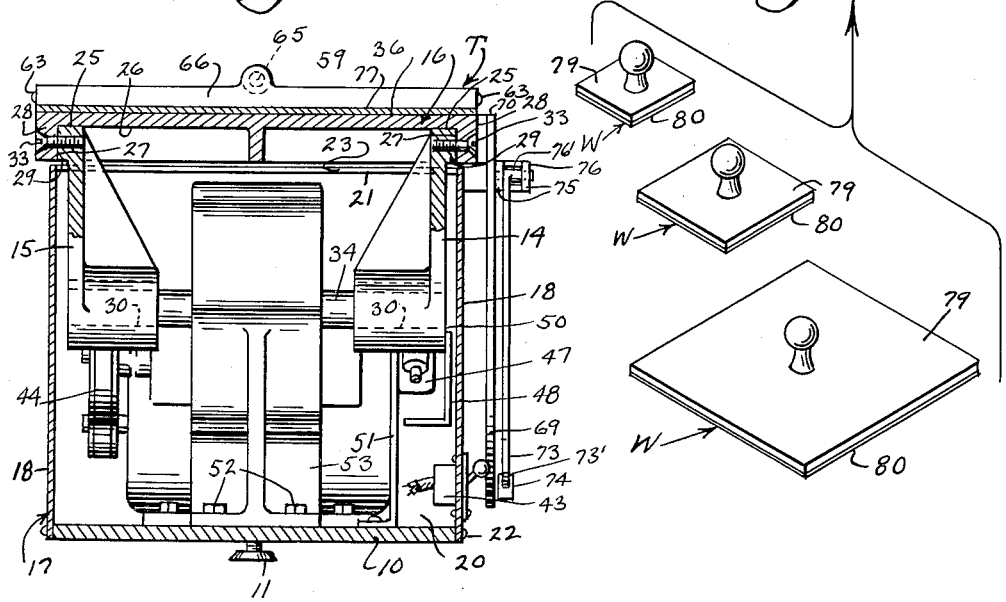
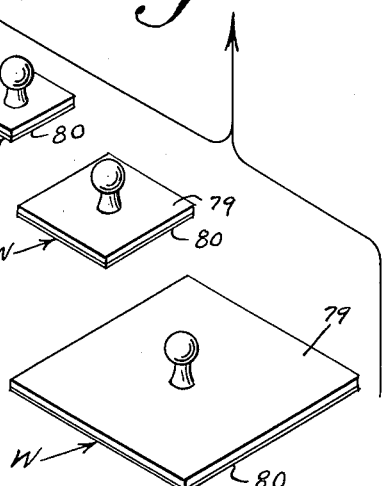
INVENTOR
FLEMING D. LONG
BY Wright and Wright
ATTORNEYS

# United States Patent Office 3,020,744
Patented Feb. 13, 1962

3,020,744
FRICTION TESTER
Fleming D. Long, Chicago, Ill., assignor, by mesne assignments, to Liberty Engineering Company, Beloit, Wis.
Filed Mar. 17, 1960, Ser. No. 15,725
5 Claims. (Cl. 73—9)

This invention appertains to measuring and testing and more particularly to a new and novel friction tester utilized to evaluate the skid resistance and static and kinetic friction coefficient of liner board, combined board, carton board, corrugated, solid fiber boxes, folding cartons and the like type paper products.

In certain instances for stacking, packaging, storing and moving cardboard boxes, cartons and the like, or in providing liners etc., it is desirable to know and measure the skid resistance of one like box in relation to another like box. Not only this, it is also desirable at times to ascertain the coefficient of friction in relation to metal or unlike types of paper products, where the carton, package etc. may be stored carried or placed.

It is, therefore a primary object of my present invention to provide a friction testing instrument for measuring skid resistance and/or obtaining the friction coefficient of paper board, paper board packages and other paper products.

A further object of my present invention is to provide a simple friction tester having a top plate or table large enough to accommodate most of the common sizes of boxes, cartons and board samples, yet small enough to fit on a laboratory bench, thus permitting testing under controlled atmoshperic conditions as prescribed by ASTM-TAPPI.

Another important object of my present invention is to provide a friction tester that is simple and rapid to operate and mechanized to minimize the human element by providing a constant rate of tilt to the platform.

Still another object of my present invention is to provide a friction tester that can be utilized to evaluate skid resistance of liner board, boxes and cartons and which can be utilized to evaluate and compare the effectiveness of non-skid coatings and treatments and will provide reproductible measurements.

Still another object of my present invention is to provide a novel means for measuring the coefficient of friction of flat samples, by utilizing predetermined rubber faced weights on the sample and correlating the results to the performance characteristics of a finished product (box or package).

Still another object of my present invention is to provide a quadrant scale securely fastened to the tiltable plate or table carrying a free swinging pointer which indicates angle of incline, and thus can be correlated to give the static friction coefficient.

A salient object of my invention resides in the fact that I provide a very versatile friction tester which can measure skid resistance in terms of static and kinetic friction in a number of ways, board to board, package to package, board to package, board to metal, package to metal, box to box, etc., in any of a great number of combinations.

A further object of my present invention is to provide the metal plate or table at one end with a spring clamp to firmly hold the board sample to be tested to the table and provide a stop at its other end to limit the slide of the product on the sample.

A still further object of my present invention is to provide a simple, practical and reliable construction that is relatively economical to manufacture, easy to assemble and positive in its operation.

With the above and other objects in view, which will more readily appear as the nature of the invention is better understood, the same consists in the novel construction, combination and arrangement of parts hereinafter more fully described, illustrated and claimed.

A preferred and practical embodiment of my invention is shown in the accompanying drawings, in which drawings, FIGURE 1 is a side elevational view of my novel friction tester showing a paper box or carton in testing position in full ines, and the table or plate tilted to measure the coefficient of friction, the tilted platform being illustrated in dotted lines;

FIGURE 2 is a top plan view of my tester with the box or carton removed and a portion of the testing sample being broken away for clarity;

FIGURE 3 is a longitudinal vertical section through the tester, taken on the line 3—3 of FIGURE 2 of the drawings looking in the direction of the arrows and again illustrating the tilting position of the platform in dotted lines;

FIGURE 4 is a horizontal section through my tester taken on the line 4—4 of FIGURE 3 of the drawings, looking in the direction of the arrows;

FIGURE 5 is a vertical transverse section through the machine taken on the line 5—5 of FIGURE 3, looking in the direction of the arrows, and FIGURE 6 is a perspective view of three of the various sized weights utilized in conjunction with testing flat samples, which represent the heavier or built up cartons.

Figure 1:
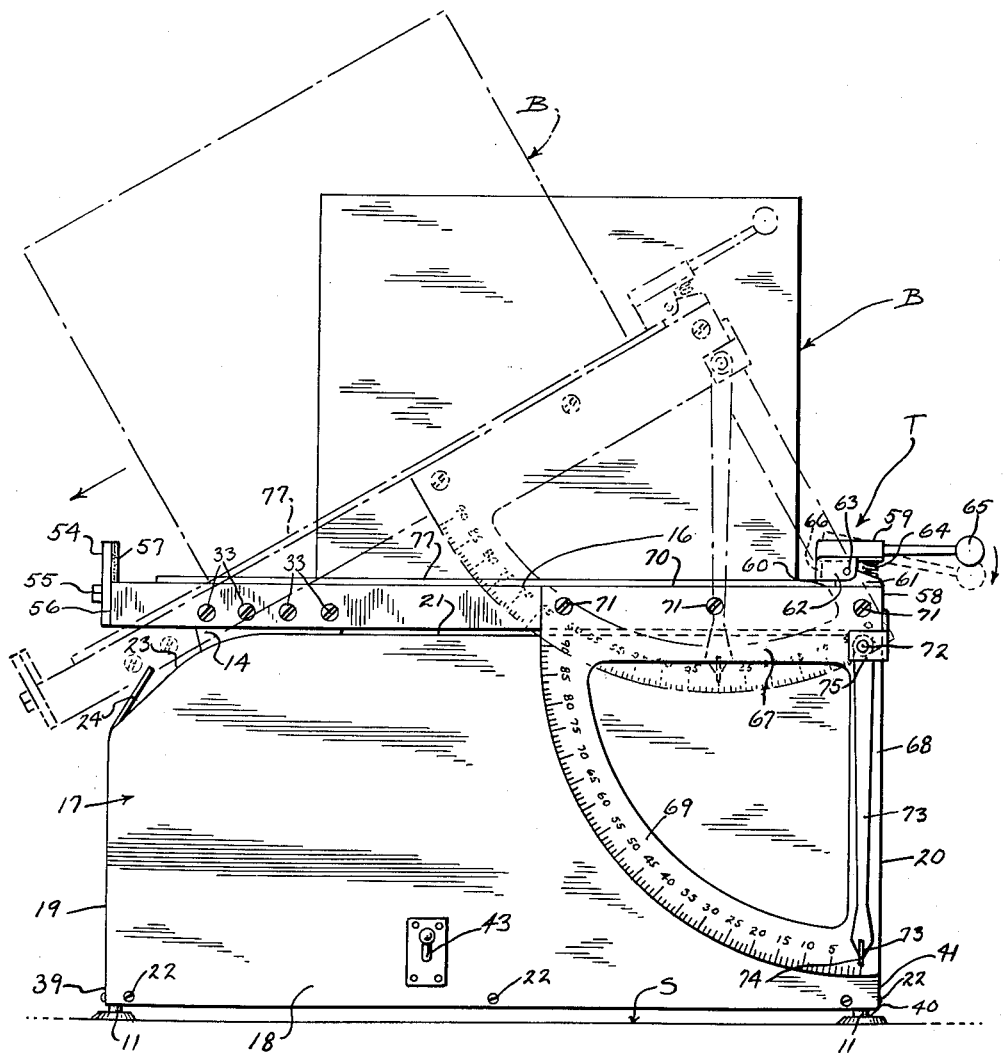

Referring now to the drawings in detail, wherein similar reference characters designate corresponding parts throughout the several views, the letter T generally indicates my novel friction tester, and the same includes broadly, a base plate 10 of generally rectangular shape provided with adjustable feet or legs 11 and supporting a motor 12 and speed reducer 13, to which are secured the end brackets 14 and 15, respectively. The end brackets are in turn secured to the top plate or testing table 16.

Referring more particularly to FIGS. 1 to 5, inclusive, it can be seen that I provide an outer casing 17 having side walls 18, a front wall 19, a rear wall 20 and a top wall 21. This casing is secured about the outer periphery of the base plate 10 by means of the metal screws 22 and completely covers and protects the internal mechanism. However, I do provide a cut-out or opening 23 at the forward end of the top wall 21, and it is through this opening that the supporting brackets 14 and 15 project so that they may be firmly secured to the top plate or table 16 and additional room is provided in the way of angularly extending slots 24 to allow for the movement and pivoting of the brackets from one extreme position shown in full lines toward a second extreme position beyond the dotted lines.

It should be borne in mind that my novel friction tester is a precision made instrument designed primarily to give the static and kinetic friction between the samples tested, and therefore all of the parts are highly machined and perfectly fitted. For example, each bracket 14 and 15 is finished so that its top surface 25 is absolutely parallel and the under surface 26 of the table 16 is parallel and where the brackets join the inner portion 27 of the depending peripheral flange 28 I provide projecting abutments 29. The lower ends of each bracket are provided with a hub receiving aperture 30 and at the upper portion thereof I form a key slot 31 so that the cut or upper surface 32 thereof is parallel and square with the top surface 25 of the bracket. Each bracket is secured to the inner surface of the peripheral edge of the flange by means of four or more machine screws or bolts 33 so that the parallel upper surfaces of the brackets 14 and 15 are flush against the parallel under surface of the table, thus insuring an exact fit. Thus when the hub 34 of the speed reducer 12 is received in the hub aperture and the key 35 inserted in the position shown in full lines, FIGURE 3 of the drawings, the table should be parallel to the base plate 10.

Now in testing, in order to be assured of the fact that the upper surface 36 of the top plate or table 16 is absolutely parallel, I provide in one corner thereof a level indicated by the numeral 37 and this level is of the bubble type, and is set in the table so that when the table is absolutely parallel, the bubble 38 will be in dead center as shown in FIGURE 2. This is the reason that I provide the adjustable feet 11 and it will be noted that only three feet are provided, a pair at the forward end 39 and a single foot 40 at the rear 41 of the device. This, of course, enables an adjustment to be made easily and quickly, thereby assuring absolute levelling of the table 16.

As previously mentioned, the base plate 10 carries the motor 12 and this motor is of a standard reversible type, and of course, is connected to a suitable source of power through the wiring connections 42 through an "Off" and "On" switch 43 mounted in the side 18. This motor 12 is connected by means of the V belt 44 to the pulley 45 of a standard type gear reduction mechanism. This particular type is of the Eberhardt-Denver type, having a reduction ratio of 2880 to 1, and the gear reduction mechanism is provided with the transversely extending hub 34 to each end of which is mounted the aforementioned brackets 14 and 15 respectively. Obviously, the brackets 14 and 15 are identically formed and must be squared up and parallel to one another. I further provide a pair of limit switches 46 and 47 respectively, and these switches are provided merely for emergency purposes, as under the normal testing the "On" and "Off" switch 43 will be operated manually and this procedure will become clearer as the description proceeds. In any event, limit switch 46 is mounted to contact a bracket 48 which in turn is secured by means of screws 49 to the lower portion 50 of the bracket 14 only, and here again, it should be noted that the bracket 48 must be accurately mounted with relation to the limit switch 46 so that the switch will be actuated to turn off the motor automatically when the table is returned to its original level position, and this position is of course indicated by the full lines in the drawings, particularly in FIGURES 1 and 3 thereof.

In most normal testing, the sample to be tested will overcome its static coefficient of friction before the table is tilted to a full ninety degrees or before the table reaches the proximity of a ninety degree tilt. However, in the event that the operator of the machine should fail to notice that the table is approaching its extreme end of travel, I provide the limit switch 47, which is so adjusted that the bracket 48 will contact the same and reverse the motor before the brackets 14 and 15 or the table 16 contacts the adjacent portions of the outer casing or cover 17, and thus damage to the cover and/or damage to the sensitive mechanism will be avoided. It is also advantageous that the limit switch 46 be made adjustable and therefore, I merely provide an elongated vertical slot 50' in the bracket 51 and the limit switch 47 carries a threaded bolt indicated in dotted lines only, which is utilized to secure the same to the bracket in any desired adjusted position or angle. The gear reduction mechanism 13 is, of course, mounted to the base plate 10 by means of bolts 52 which extend through various flanges normally provided in its outer casing 53.

A salient feature of my invention resides in the top plate or table 16 and it should be noted that the brackets 14 and 15 are fastened to this table adjacent the forward end thereof, thus enabling the table to have a maximum tilt or angle of inclination with a minimum or rotation of the hub 34 and brackets 14 and 15. Further the upper surface 36 of the table is finished smooth and flat and is preferably copper nickel chrome plate. This is important, in that, this surface is utilized whenever a metal to metal or metal to paper coefficient of friction is desired to be measured. Further, at the forward end of the table I provide a stop 54 and this stop is merely in the form of a rectangular plate bolted at 55 to the forward edge 56 of the peripheral flange, and this plate is in turn provided with an inner cushioning strip 57 of rubber or the like. The obvious use of this stop is to prevent the material being tested from sliding off of the table. At the other end 58 of the table I provide a clip 59. This clip 59 is pivoted to the sides 60 of the table by means of the upstanding lugs 61 and the inwardly directed lugs 62 through which the pivot pins 63 are secured. Further, the clip is held in its holding position by means of a spring 64 placed directly beneath the operating handle 65 and constantly urges the depending flange 66 toward its sample holding position illustrated clearly in FIGURE 3 of the drawings.

In order to arrive at the coefficient of friction between any two similar samples, it is necessary to accurately determine the angle of incline at which the sample overcomes its static friction. In other words, starts to move or slide. Therefore, in order to accurately determine this angle, I provide a scale in the form of a quadrant and this quadrant includes the legs 67 and 68 which are at right angles to one another and joined by the arcuate scale portion 69. The scale portion is graduated in ninety degrees, into 1 degree increments and numeraled every five degrees, as shown. The leg 67 is lengthened and somewhat thicker than the leg 68 to facilitate the fastening the quadrant or scale to the rear portion of the table. Here again, the top surface 70 of the leg 67 is secured absolutely parallel with the top surface 36 of the table by means of fastening screws 71. At the exact intersection of the zero indication and the ninety degree indication on the scale, indicated by the numeral 72, I provide a free swinging pivoted indicating hand 73, and this hand is further split at its end point termination 73' and provided with a fine extension 74 to facilitate close and accurate reading. The other end of the hand or pointer is pivoted as shown more clearly in FIGURES 2 and 5 of the drawings, by providing a pair of spaced parallel and forwardly extending legs 75 formed on the bracket 76 which of course in turn is secured to the rear portion of the table 16. Between these parallel extending legs, the hub or thickened end 76' of the pointer or hand is accurately pivoted so as to be free swinging. Obviously, any known method of pivoting this hand may be utilized which is practical, such as jeweled bearings or pointed bearings received in conical shaped apertures at either end of the thickened portion 76 but it is not thought necessary that this matter be disclosed or shown in detail.

Now it is obvious from the foregoing and particularly by noting FIGURE 1 of the drawings, that when the table is tilted from a full line position, to its dotted line position, that the pointer or hand will pivot so as to indicate accurately the exact angle of inclination of the surface 36 of the table 16 and from this reading it is possible to correlate the coefficient of friction of the material being tested.

The procedure necessary in testing the coefficient of friction between materials is as follows: Assuming that it is desirable to find out the coefficient of friction between two like cartons or boxes B—the first thing to be done is to cut out a flat sample, indicated by the numeral 77 and secure the same to the table by fastening it under the clip 59. Obviously, this sample 77 is of the same characteristics and is in fact the same material as the bottom of the box B. The box B is then placed on the table on top of the sample and of course the table is levelled up, so that the bubble 38 is centered. The operator then flips the switch 43, thus starting the motor 12 and rotating the shaft 34 through the gear reduction mechanism and the table starts to move or tilt from its full line position toward an indicated dotted line position, and it will be asumed that at the dotted line position shown in the drawing, the box starts to slide. The operator then immediately flips the switch 43 to an "Off" position, stopping the motor and the angle of inclination is noted, and from this the coefficient of friction is obtained. Thus, a manufacturer will know the type of material necessary for the needs of the consumer, and the consumer will know at what angles the various cartons can be stacked before they will slide or be otherwise damaged or disturbed.

As previously mentioned, the friction between metal and paper or cardboard can be tested, and this is done by utilizing the chrome plated surface 36 and placing loosely thereon the sample to be tested. If the sample to be tested is supposed to be of a known weight, one of the weights W illustrated in FIGURE 6 of the drawings is utilized and these weights merely include a rectangular metal body 79 and a rubber face 80. Thus, when the weight is placed on the sample the weight will not slide in relation to the sample and when the table is tilted the switch is again actuated and when the sample moves, the coefficient of friction can be obtained. This system of the weights W may also be utilized where it is not feasible to use the actual sample. For example, a carton may be too large to be placed on the table 16, but by correlating a cutout predetermined size sample of the same material with one of the weights, indicated in FIGURE 6, the test can be accurately carried on in the same manner as described for testing the difference between metal and paper board. In other words, one sample is placed under the clip and the other sample placed loosely on top and then the weight placed on top of that.

From the foregoing, it is believed that the features and advantages of my invention will be readily apparent to those skilled in the art and it will, of course, be understood that changes in the form, proportion and minor details of construction may be resorted to without departing from the spirit or scope of the appended claims.

I claim:
1. A device for testing the skid resistance between materials comprising, a base plate, a reversible motor and a gear reduction mechanism in drive connection with said motor mounted on said plate, said gear reduction mechanism having a drive shaft extending transversely thereof and providing a hub on each end, a cover having front, rear, side and top walls fitted over said motor and gear reduction mechanism and secured to said plate, said cover having an enlarged opening in portions of said top and front walls above and in alignment with said hubs, a pair of brackets, each keyed to a respective hub and in one position projecting vertically through a respective portion of said enlarged opening and terminating above said top wall, a testing table carried by said brackets and being parallel to said base plate in its inactive at rest position, means secured to said table adjacent one end thereof for firmly holding a sample thereto, means including an arcuate scale and indicator for indicating the angle of tilt of said table, stop means at the opposite end of said table for limiting the movement of a loose sample placed thereon, and means between a source of power and said reversible motor for starting and stopping said motor.

2. A device as set forth in claim 1, wherein additional means is provided to limit the angle of inclination of the testing table.

3. A device as set forth in claim 1, wherein the top surface of said testing table is highly polished and finished in a copper nickel chrome plate.

4. A device as set forth in claim 1, wherein said table is provided with a level, and means associated with said base plate for adjusting the relative position of said base plate in relation to its supporting surface.

5. A device for testing the skid resistance between materials comprising, a substantially rectangular base plate, a reversible motor and a gear reduction mechanism in drive connection with said motor mounted on said plate, said gear reduction mechanism having a drive shaft extending transversely thereof and providing a hub on each end adjacent the front portion of said base plate, a cover having front, rear, side and top walls fitted over said motor and gear reduction mechanism and secured to said plate, said cover having an enlarged opening in portions of said top and front walls above and in alignment with said hubs, a pair of brackets, each keyed to a respective hub and in one position projecting vertically through a respective portion of said elongated opening and terminating above said top wall, a testing table carried by said brackets and being parallel to said base plate in its inactive at rest position, means including a spring clip secured to said table adjacent one end thereof for firmly holding a sample thereto, means including an arcuate scale and indicator secured to said table for indicating the angle of tilt of said table, stop means at the opposite end of said table for limiting the movement of a loose sample placed thereon, a level recessed in said testing table adjacent said arcuate scale and indicator, adjustable legs for supporting said device and said base plate, each leg being positioned adjacent to a corner of said base plate, and means between a source of power and said reversible motor for starting and stopping said motor.

References Cited in the file of this patent

UNITED STATES PATENTS

| | | |
|---|---|---|
| 1,772,415 | Carpenter | Aug. 5, 1930 |
| 2,913,896 | Barron | Nov. 24, 1959 |